United States Patent
Ozaki et al.

(10) Patent No.: US 7,512,290 B2
(45) Date of Patent: **\*Mar. 31, 2009**

(54) IMAGE PROCESSING APPARATUS WITH SIMD-TYPE MICROPROCESSOR TO PERFORM LABELING

(75) Inventors: Tomoaki Ozaki, Osaka (JP); Shinichi Yamaura, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/968,521

(22) Filed: Jan. 2, 2008

(65) Prior Publication Data

US 2008/0107339 A1    May 8, 2008

Related U.S. Application Data

(63) Continuation of application No. 11/015,933, filed on Dec. 17, 2004, now Pat. No. 7,340,113.

(30) Foreign Application Priority Data

Dec. 24, 2003    (JP) .............................. 2003-427624

(51) Int. Cl.
*G06K 9/00* (2006.01)
(52) U.S. Cl. ........................ 382/318; 382/180; 382/199; 382/319
(58) Field of Classification Search ................. 382/180, 382/199, 318, 319; 711/207, 205, E12.061; 710/30, 33; 715/234
See application file for complete search history.

(56) References Cited

U.S. PATENT DOCUMENTS

| 4,307,377 A | 12/1981 | Pferd et al. | .................. 382/242 |
| 4,375,654 A | 3/1983 | Evans et al. | .................. 382/199 |
| 4,805,116 A | 2/1989 | Liang et al. | .................. 345/606 |
| 7,340,113 B2 * | 3/2008 | Ozaki et al. | .................. 382/318 |

FOREIGN PATENT DOCUMENTS

| JP | 7-192130 | 7/1995 |
| JP | 2002-230540 | 8/2002 |

OTHER PUBLICATIONS

Gonzalez et al., "MIP: A Flexible Microprogrammable Image Processor", IEEE, vol. 7, May 1982, pp. 1211-1214.

\* cited by examiner

*Primary Examiner*—Anh Hong Do
(74) *Attorney, Agent, or Firm*—Cooper & Dunham, LLP

(57) ABSTRACT

An image processing apparatus includes a plurality of processor elements including registers and configured to process respective data items, a global processor configured to control the plurality oaf processor elements; the global processor and the plurality of processor elements constituting an SIMD microprocessor, and a data control device coupled to a data transfer port for accessing the registers, the processor elements configured to perform a contiguity check and tentative labeling of pixels adjacent in a sub-scan direction as parallel processes with respect to binary image data, the data control device configured to perform a contiguity check and tentative labeling of pixels adjacent in a main scan direction as consecutive processes, and the parallel processes performed ahead of the consecutive processes with respect to a line of interest in the binary image data.

17 Claims, 21 Drawing Sheets

FIG.2A

IMAGE DATA

| L01 | ● | ● |   |   |   |
|-----|---|---|---|---|---|
| L02 | ● | ● | ● |   |   |
| L03 |   |   |   | ● | ● |
| L04 |   |   | ● | ● | ● |
| L05 |   |   | ● | ● | ● |

FIG.2B

IMAGE DATA

| L01 | 1 | 1 |   |   |   |
|-----|---|---|---|---|---|
| L02 | 1 | 1 | 1 |   |   |
| L03 |   |   |   | 2 | 2 |
| L04 |   |   | 3 | 2 | 2 |
| L05 |   |   | 3 | 2 | 2 |

FIG.2C

IMAGE DATA

| L01 | 1 | 1 |   |   |   |
|-----|---|---|---|---|---|
| L02 | 1 | 1 | 1 |   |   |
| L03 |   |   |   | 2 | 2 |
| L04 |   |   | 2 | 2 | 2 |
| L05 |   |   | 2 | 2 | 2 |

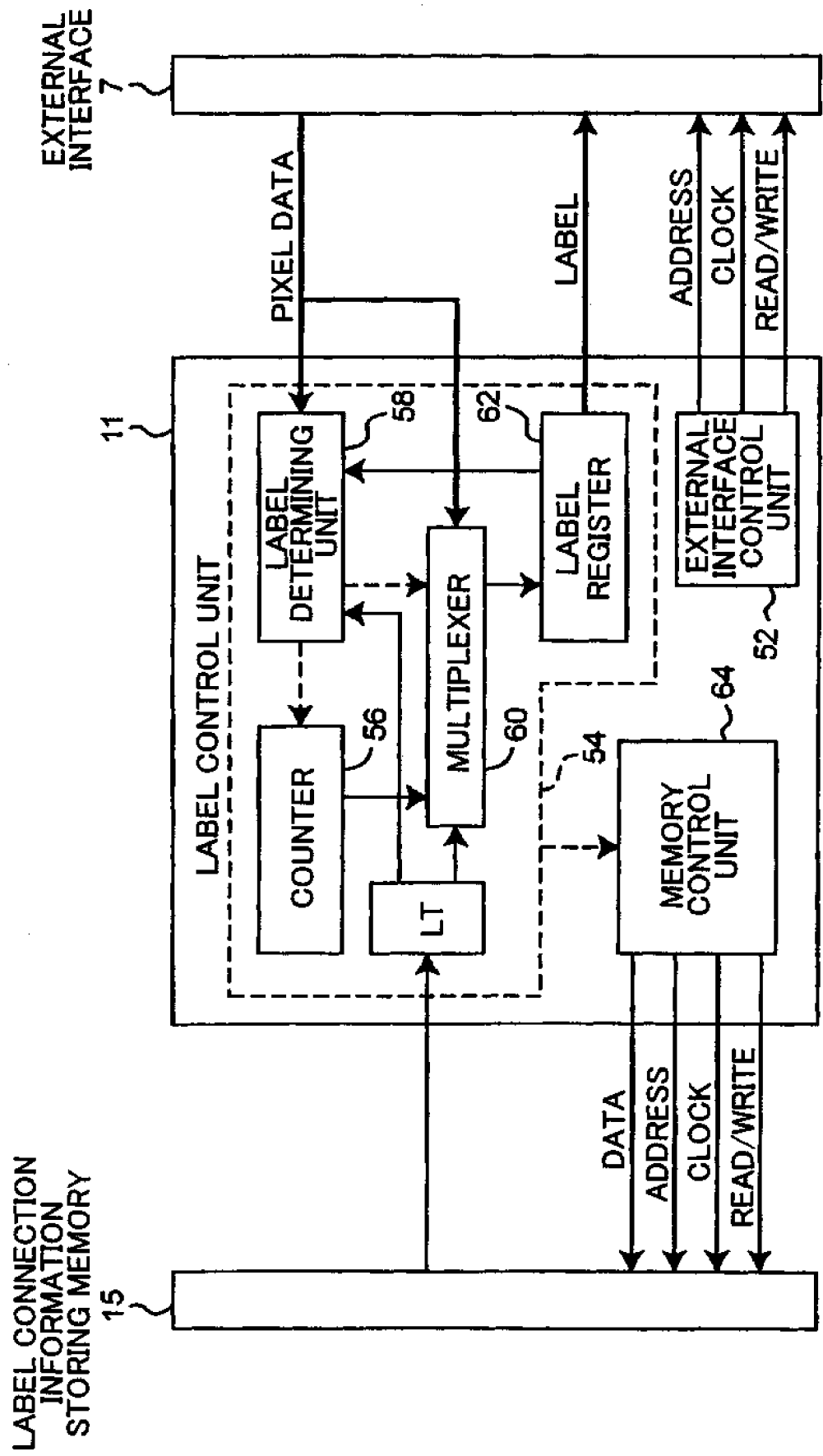

| ADDRESS | INFORMATION ABOUT CONNECTION |
|---|---|
| 0000h | – |
| 0001h | FFFFh |
| 0002h | FFFFh |
| 0003h | FFFFh |
| 0004h | FFFFh |
| 0005h | FFFFh |
| 0006h | FFFFh |
| 0007h | FFFFh |
| ⋮ | ⋮ |

FIG.4F

| ADDRESS | INFORMATION ABOUT CONNECTION |
|---|---|
| 0000h | – |
| 0001h | 0000h |
| 0002h | 0000h |
| 0003h | FFFFh |
| 0004h | FFFFh |
| 0005h | FFFFh |
| 0006h | FFFFh |
| 0007h | FFFFh |
| ⋮ | ⋮ |

FIG.4G

| ADDRESS | INFORMATION ABOUT CONNECTION |
|---|---|
| 0000h | – |
| 0001h | 0000h |
| 0002h | 0000h |
| 0003h | FFFFh |
| 0004h | FFFFh |
| 0005h | FFFFh |
| 0006h | FFFFh |
| 0007h | FFFFh |
| ⋮ | ⋮ |

FIG.4H

| ADDRESS | INFORMATION ABOUT CONNECTION |
|---|---|
| 0000h | – |
| 0001h | 0000h |
| 0002h | 0000h |
| 0003h | 0000h |
| 0004h | FFFFh |
| 0005h | FFFFh |
| 0006h | FFFFh |
| 0007h | FFFFh |
| ⋮ | ⋮ |

FIG.5A

| | L01 | | 1 | 1 | 1 | 1 | 1 | 1 | | 2 | |
|---|---|---|---|---|---|---|---|---|---|---|---|
| | L02 | 3 | | | | | | | | 2 | |
| | L03 | 3 | | | | | | ● | | 2 | |
| | L04 | ● | | ● | ● | ● | | ● | | ● | |
| | L05 | ● | | ● | | ● | | ● | | ● | |
| | L06 | ● | ● | ● | | ● | ● | ● | ● | ● | ● |
| | L07 | ● | | | ● | | | ● | | | |
| | L08 | ● | | | ● | ● | ● | ● | ● | ● | |
| | L09 | | ● | ● | | | | | | | |
| | L10 | | | | | | | | | | |

FIG.5B

| | L01 | | 1 | 1 | 1 | 1 | 1 | 1 | | 2 | |
|---|---|---|---|---|---|---|---|---|---|---|---|
| | L02 | 3 | | | | | | | | 2 | |
| | L03 | 3 | | | | | | 4 | | 2 | |
| | L04 | ● | | ● | ● | ● | | ● | | ● | |
| | L05 | ● | | ● | | ● | | ● | | ● | |
| | L06 | ● | ● | ● | | ● | ● | ● | ● | ● | ● |
| | L07 | ● | | | ● | | | ● | | | |
| | L08 | ● | | | ● | ● | ● | ● | ● | ● | |
| | L09 | | ● | ● | | | | | | | |
| | L10 | | | | | | | | | | |

FIG.5C

| | L01 | | 1 | 1 | 1 | 1 | 1 | 1 | | 2 | |
|---|---|---|---|---|---|---|---|---|---|---|---|
| | L02 | 3 | | | | | | | | 2 | |
| | L03 | 3 | | | | | | 4 | | 2 | |
| | L04 | 3 | | ● | ● | ● | | 4 | | 2 | |
| | L05 | ● | | ● | | ● | | ● | | ● | |
| | L06 | ● | ● | ● | | ● | ● | ● | ● | ● | ● |
| | L07 | ● | | | ● | | | ● | | | |
| | L08 | ● | | | ● | ● | ● | ● | ● | ● | |
| | L09 | | ● | ● | | | | | | | |
| | L10 | | | | | | | | | | |

FIG.5D

| | L01 | | 1 | 1 | 1 | 1 | 1 | 1 | | 2 | |
|---|---|---|---|---|---|---|---|---|---|---|---|
| | L02 | 3 | | | | | | | | 2 | |
| | L03 | 3 | | | | | | 4 | | 2 | |
| | L04 | 3 | | 5 | 5 | 5 | | 4 | | 2 | |
| | L05 | ● | | ● | | ● | | ● | | ● | |
| | L06 | ● | ● | ● | | ● | ● | ● | ● | ● | ● |
| | L07 | ● | | | ● | | | ● | | | |
| | L08 | ● | | | ● | ● | ● | ● | ● | ● | |
| | L09 | | ● | ● | | | | | | | |
| | L10 | | | | | | | | | | |

FIG.5E

| ADDRESS | INFORMATION ABOUT CONNECTION |
|---|---|
| 0000h | – |
| 0001h | 0000h |
| 0002h | 0000h |
| 0003h | 0000h |
| 0004h | FFFFh |
| 0005h | FFFFh |
| 0006h | FFFFh |
| 0007h | FFFFh |
| ⋮ | ⋮ |

FIG.5F

| ADDRESS | INFORMATION ABOUT CONNECTION |
|---|---|
| 0000h | – |
| 0001h | 0000h |
| 0002h | 0000h |
| 0003h | 0000h |
| 0004h | 0000h |
| 0005h | FFFFh |
| 0006h | FFFFh |
| 0007h | FFFFh |
| ⋮ | ⋮ |

FIG.5G

| ADDRESS | INFORMATION ABOUT CONNECTION |
|---------|------------------------------|
| 0000h   | –                            |
| 0001h   | 0000h                        |
| 0002h   | 0000h                        |
| 0003h   | 0000h                        |
| 0004h   | 0000h                        |
| 0005h   | FFFFh                        |
| 0006h   | FFFFh                        |
| 0007h   | FFFFh                        |
| ⋮       | ⋮                            |

FIG.5H

| ADDRESS | INFORMATION ABOUT CONNECTION |
|---------|------------------------------|
| 0000h   | –                            |
| 0001h   | 0000h                        |
| 0002h   | 0000h                        |
| 0003h   | 0000h                        |
| 0004h   | 0000h                        |
| 0005h   | 0000h                        |
| 0006h   | FFFFh                        |
| 0007h   | FFFFh                        |
| ⋮       | ⋮                            |

FIG.6A

| L01 |   | 1 | 1 | 1 | 1 | 1 | 1 |   | 2 |   |
|-----|---|---|---|---|---|---|---|---|---|---|
| L02 | 3 |   |   |   |   |   |   |   | 2 |   |
| L03 | 3 |   |   |   |   |   | 4 |   | 2 |   |
| L04 | 3 |   | 5 | 5 | 5 |   | 4 |   | 2 |   |
| L05 | 3 |   | 5 |   | 5 |   | 4 |   | 2 |   |
| L06 | ● | ● | ● |   | ● | ● | ● | ● | ● | ● |
| L07 | ● |   |   | ● |   |   | ● |   |   |   |
| L08 | ● |   |   | ● | ● | ● | ● | ● | ● |   |
| L09 |   | ● | ● |   |   |   |   |   |   |   |
| L10 |   |   |   |   |   |   |   |   |   |   |

FIG.6B

| L01 |   | 1 | 1 | 1 | 1 | 1 | 1 |   | 2 |   |
|-----|---|---|---|---|---|---|---|---|---|---|
| L02 | 3 |   |   |   |   |   |   |   | 2 |   |
| L03 | 3 |   |   |   |   |   | 4 |   | 2 |   |
| L04 | 3 |   | 5 | 5 | 5 |   | 4 |   | 2 |   |
| L05 | 3 |   | 5 |   | 5 |   | 4 |   | 2 |   |
| L06 | ● | ● | ● |   | ● | ● | ● | ● | ● | ● |
| L07 | ● |   |   | ● |   |   | ● |   |   |   |
| L08 | ● |   |   | ● | ● | ● | ● | ● | ● |   |
| L09 |   | ● | ● |   |   |   |   |   |   |   |
| L10 |   |   |   |   |   |   |   |   |   |   |

FIG.6C

| L01 |   | 1 | 1 | 1 | 1 | 1 | 1 |   | 2 |   |
|-----|---|---|---|---|---|---|---|---|---|---|
| L02 | 3 |   |   |   |   |   |   |   | 2 |   |
| L03 | 3 |   |   |   |   |   | 4 |   | 2 |   |
| L04 | 3 |   | 5 | 5 | 5 |   | 4 |   | 2 |   |
| L05 | 3 |   | 5 |   | 5 |   | 4 |   | 2 |   |
| L06 | 3 | ● | 5 |   | 5 | ● | 4 | ● | 2 | ● |
| L07 | ● |   |   | ● |   |   | ● |   |   |   |
| L08 | ● |   |   | ● | ● | ● | ● | ● | ● |   |
| L09 |   | ● | ● |   |   |   |   |   |   |   |
| L10 |   |   |   |   |   |   |   |   |   |   |

FIG.6D

| L01 |   | 1 | 1 | 1 | 1 | 1 | 1 |   | 2 |   |
|-----|---|---|---|---|---|---|---|---|---|---|
| L02 | 3 |   |   |   |   |   |   |   | 2 |   |
| L03 | 3 |   |   |   |   |   | 4 |   | 2 |   |
| L04 | 3 |   | 5 | 5 | 5 |   | 4 |   | 2 |   |
| L05 | 3 |   | 5 |   | 5 |   | 4 |   | 2 |   |
| L06 | 3 | 3 | 3 |   | 3 | 3 | 3 | 3 | 2 | 2 |
| L07 | ● |   |   | ● |   |   | ● |   |   |   |
| L08 | ● |   |   | ● | ● | ● | ● | ● | ● |   |
| L09 |   | ● | ● |   |   |   |   |   |   |   |
| L10 |   |   |   |   |   |   |   |   |   |   |

FIG.6E

| ADDRESS | INFORMATION ABOUT CONNECTION |
|---|---|
| 0000h | — |
| 0001h | 0000h |
| 0002h | 0000h |
| 0003h | 0000h |
| 0004h | 0000h |
| 0005h | 0000h |
| 0006h | FFFFh |
| 0007h | FFFFh |
| ⋮ | ⋮ |

FIG.6F

| ADDRESS | INFORMATION ABOUT CONNECTION |
|---|---|
| 0000h | — |
| 0001h | 0000h |
| 0002h | 0000h |
| 0003h | 0000h |
| 0004h | 0000h |
| 0005h | 0000h |
| 0006h | FFFFh |
| 0007h | FFFFh |
| ⋮ | ⋮ |

FIG.6G

| ADDRESS | INFORMATION ABOUT CONNECTION |
|---|---|
| 0000h | – |
| 0001h | 0000h |
| 0002h | 0000h |
| 0003h | 0000h |
| 0004h | 0000h |
| 0005h | 0000h |
| 0006h | FFFFh |
| 0007h | FFFFh |
| ⋮ | ⋮ |

FIG.6H

| ADDRESS | INFORMATION ABOUT CONNECTION |
|---|---|
| 0000h | – |
| 0001h | 0000h |
| 0002h | 0000h |
| 0003h | 0002h |
| 0004h | 0002h |
| 0005h | 0002h |
| 0006h | FFFFh |
| 0007h | FFFFh |
| ⋮ | ⋮ |

FIG.7A

| | | | | | | | | | |
|---|---|---|---|---|---|---|---|---|---|
| L01 | | 1 | 1 | 1 | 1 | 1 | 1 | | 2 |
| L02 | 3 | | | | | | | | 2 |
| L03 | 3 | | | | | | 4 | | 2 |
| L04 | 3 | | 5 | 5 | 5 | | 4 | | 2 |
| L05 | 3 | | 5 | | 5 | | 4 | | 2 |
| L06 | 3 | 3 | 3 | | 3 | 3 | 3 | 3 | 2 | 2 |
| L07 | 3 | | | ● | | | | 3 | |
| L08 | ● | | | ● | ● | ● | ● | ● | ● |
| L09 | | ● | ● | | | | | | |
| L10 | | | | | | | | | |

FIG.7B

| | | | | | | | | | |
|---|---|---|---|---|---|---|---|---|---|
| L01 | | 1 | 1 | 1 | 1 | 1 | 1 | | 2 |
| L02 | 3 | | | | | | | | 2 |
| L03 | 3 | | | | | | 4 | | 2 |
| L04 | 3 | | 5 | 5 | 5 | | 4 | | 2 |
| L05 | 3 | | 5 | | 5 | | 4 | | 2 |
| L06 | 3 | 3 | 3 | | 3 | 3 | 3 | 3 | 2 | 2 |
| L07 | 3 | | | 6 | | | | 3 | |
| L08 | ● | | | ● | ● | ● | ● | ● | ● |
| L09 | | ● | ● | | | | | | |
| L10 | | | | | | | | | |

FIG.7C

| | | | | | | | | | |
|---|---|---|---|---|---|---|---|---|---|
| L01 | | 1 | 1 | 1 | 1 | 1 | 1 | | 2 |
| L02 | 3 | | | | | | | | 2 |
| L03 | 3 | | | | | | 4 | | 2 |
| L04 | 3 | | 5 | 5 | 5 | | 4 | | 2 |
| L05 | 3 | | 5 | | 5 | | 4 | | 2 |
| L06 | 3 | 3 | 3 | | 3 | 3 | 3 | 3 | 2 | 2 |
| L07 | 3 | | | 6 | | | | 3 | |
| L08 | 3 | | | 6 | ● | ● | ● | 3 | ● |
| L09 | | ● | ● | | | | | | |
| L10 | | | | | | | | | |

FIG.7D

| | | | | | | | | | |
|---|---|---|---|---|---|---|---|---|---|
| L01 | | 1 | 1 | 1 | 1 | 1 | 1 | | 2 |
| L02 | 3 | | | | | | | | 2 |
| L03 | 3 | | | | | | 4 | | 2 |
| L04 | 3 | | 5 | 5 | 5 | | 4 | | 2 |
| L05 | 3 | | 5 | | 5 | | 4 | | 2 |
| L06 | 3 | 3 | 3 | | 3 | 3 | 3 | 3 | 2 | 2 |
| L07 | 3 | | | 6 | | | | 3 | |
| L08 | 3 | | | 6 | 6 | 6 | 6 | 2 | 2 |
| L09 | | ● | ● | | | | | | |
| L10 | | | | | | | | | |

FIG.7E

| ADDRESS | INFORMATION ABOUT CONNECTION |
|---------|------------------------------|
| 0000h   | –                            |
| 0001h   | 0000h                        |
| 0002h   | 0000h                        |
| 0003h   | 0002h                        |
| 0004h   | 0002h                        |
| 0005h   | 0002h                        |
| 0006h   | FFFFh                        |
| 0007h   | FFFFh                        |
| ⋮       | ⋮                            |

FIG.7F

| ADDRESS | INFORMATION ABOUT CONNECTION |
|---------|------------------------------|
| 0000h   | –                            |
| 0001h   | 0000h                        |
| 0002h   | 0000h                        |
| 0003h   | 0002h                        |
| 0004h   | 0002h                        |
| 0005h   | 0002h                        |
| 0006h   | 0000h                        |
| 0007h   | FFFFh                        |
| ⋮       | ⋮                            |

FIG.7G

| ADDRESS | INFORMATION ABOUT CONNECTION |
|---------|------------------------------|
| 0000h   | –                            |
| 0001h   | 0000h                        |
| 0002h   | 0000h                        |
| 0003h   | 0002h                        |
| 0004h   | 0002h                        |
| 0005h   | 0002h                        |
| 0006h   | 0000h                        |
| 0007h   | FFFFh                        |
| :       | :                            |

FIG.7H

| ADDRESS | INFORMATION ABOUT CONNECTION |
|---------|------------------------------|
| 0000h   | –                            |
| 0001h   | 0000h                        |
| 0002h   | 0000h                        |
| 0003h   | 0002h                        |
| 0004h   | 0002h                        |
| 0005h   | 0002h                        |
| 0006h   | 0002h                        |
| 0007h   | FFFFh                        |
| :       | :                            |

FIG.8A

| | C1 | C2 | C3 | C4 | C5 | C6 | C7 | C8 | C9 |
|---|---|---|---|---|---|---|---|---|---|
| L01 | | 1 | 1 | 1 | 1 | 1 | 1 | | 2 | |
| L02 | 3 | | | | | | | | 2 | |
| L03 | 3 | | | | | 4 | | | 2 | |
| L04 | 3 | | 5 | 5 | 5 | | 4 | | 2 | |
| L05 | 3 | | 5 | | 5 | | 4 | | 2 | |
| L06 | 3 | 3 | 3 | | 3 | 3 | 3 | 3 | 2 | 2 |
| L07 | 3 | | | 6 | | | | 3 | | |
| L08 | 3 | | | 6 | 6 | 6 | 6 | | 2 | 2 |
| L09 | | ● | ● | | | | | | | |
| L10 | | | | | | | | | | |

FIG.8B

| | C1 | C2 | C3 | C4 | C5 | C6 | C7 | C8 | C9 |
|---|---|---|---|---|---|---|---|---|---|
| L01 | | 1 | 1 | 1 | 1 | 1 | 1 | | 2 | |
| L02 | 3 | | | | | | | | 2 | |
| L03 | 3 | | | | | 4 | | | 2 | |
| L04 | 3 | | 5 | 5 | 5 | | 4 | | 2 | |
| L05 | 3 | | 5 | | 5 | | 4 | | 2 | |
| L06 | 3 | 3 | 3 | | 3 | 3 | 3 | 3 | 2 | 2 |
| L07 | 3 | | | 6 | | | | 3 | | |
| L08 | 3 | | | 6 | 6 | 6 | 6 | | 2 | 2 |
| L09 | | 7 | 7 | | | | | | | |
| L10 | | | | | | | | | | |

FIG.8C

| | C1 | C2 | C3 | C4 | C5 | C6 | C7 | C8 | C9 |
|---|---|---|---|---|---|---|---|---|---|
| L01 | | 1 | 1 | 1 | 1 | 1 | 1 | | 2 | |
| L02 | 3 | | | | | | | | 2 | |
| L03 | 3 | | | | | 4 | | | 2 | |
| L04 | 3 | | 5 | 5 | 5 | | 4 | | 2 | |
| L05 | 3 | | 5 | | 5 | | 4 | | 2 | |
| L06 | 3 | 3 | 3 | | 3 | 3 | 3 | 3 | 2 | 2 |
| L07 | 3 | | | 6 | | | | 3 | | |
| L08 | 3 | | | 6 | 6 | 6 | 6 | | 2 | 2 |
| L09 | | 7 | 7 | | | | | | | |
| L10 | | | | | | | | | | |

FIG.8D

| | C1 | C2 | C3 | C4 | C5 | C6 | C7 | C8 | C9 |
|---|---|---|---|---|---|---|---|---|---|
| L01 | | 1 | 1 | 1 | 1 | 1 | 1 | | 2 | |
| L02 | 2 | | | | | | | | 2 | |
| L03 | 2 | | | | | 2 | | | 2 | |
| L04 | 2 | | 2 | 2 | 2 | | 2 | | 2 | |
| L05 | 2 | | 2 | | 2 | | 2 | | 2 | |
| L06 | 2 | 2 | 2 | | 2 | 2 | 2 | 2 | 2 | 2 |
| L07 | 2 | | | 2 | | | | 2 | | |
| L08 | 2 | | | 2 | 2 | 2 | 2 | | 2 | 2 |
| L09 | | 3 | 3 | | | | | | | |
| L10 | | | | | | | | | | |

FIG.8E

| ADDRESS | INFORMATION ABOUT CONNECTION |
|---|---|
| 0000h | – |
| 0001h | 0000h |
| 0002h | 0000h |
| 0003h | 0002h |
| 0004h | 0002h |
| 0005h | 0002h |
| 0006h | 0002h |
| 0007h | FFFFh |
| ⋮ | ⋮ |

FIG.8F

| ADDRESS | INFORMATION ABOUT CONNECTION |
|---|---|
| 0000h | – |
| 0001h | 0000h |
| 0002h | 0000h |
| 0003h | 0002h |
| 0004h | 0002h |
| 0005h | 0002h |
| 0006h | 0002h |
| 0007h | 0000h |
| ⋮ | ⋮ |

FIG.8G

| ADDRESS | INFORMATION ABOUT CONNECTION |
|---|---|
| 0000h | – |
| 0001h | 0001h |
| 0002h | 0002h |
| 0003h | 0002h |
| 0004h | 0002h |
| 0005h | 0002h |
| 0006h | 0002h |
| 0007h | 0003h |
| ⋮ | ⋮ |

FIG.8H

| ADDRESS | INFORMATION ABOUT CONNECTION |
|---|---|
| 0000h | – |
| 0001h | 0001h |
| 0002h | 0002h |
| 0003h | 0002h |
| 0004h | 0002h |
| 0005h | 0002h |
| 0006h | 0002h |
| 0007h | 0003h |
| ⋮ | ⋮ |

IMAGE PROCESSING APPARATUS WITH SIMD-TYPE MICROPROCESSOR TO PERFORM LABELING

CROSS-REFERENCE TO RELATED APPLICATION

This application is a Rule.1.53(b) Continuaticin of U.S. Ser. No. 11/015,933 filed Dec. 17, 2004 now U.S. Pat. No. 7,340,113, the entire contents of which are incorporated by reference herein.

BACKGROUND

1. Technical Field

This disclosure generally relates to image processing apparatuses, and particularly relates to an image processing apparatus provided with a SIMD-type microprocessor.

2. Description of the Related Art

As a general image processing method applicable to binary image data, "labeling" assigns the same labels (e.g., one of the numbers in an ascending order) to contiguous feature pixels.

As methods for determining contiguity, a four-neighbor method checks the contiguity of four pixels on the top, left, right, and bottom sides of the pixel of interest, and an eight-neighbor method checks the contiguity of eight surrounding pixels inclusive of the above-identified four pixels and additional four pixels diagonally adjacent to the pixel of interest. In this specification, all the examples will be presented based on the four-neighbor method. When labeling is performed with respect to binary image data two-dimensionally arranged in memory, a pixel of interest is processed by referring to the result of processing of an adjacent pixel on the left or an adjacent pixel on the top side. With such referencing, consecutive processing is performed by scanning the binary image data in the direction toward the right (i.e., main scan direction) and in the direction toward the bottom (i.e., sub-scan direction), starting from the pixel at the top left corner. Such consecutive processing requires a lengthy processing time.

There may be a case in which two or more areas having respective, different labels (tentative labels) assigned by preceding processing are connected together (or found to be the contiguous areas) at later processing. In such a case, the values of the labels need to be updated, with the newly assigned same label value. To this end, information about connections between the tentative labels may be stored. After tentative labeling is finished with respect to all the pixels, the scanning (final labeling) of the image data may be repeated by referring to the information about connections until all the feature pixels connected together are assigned with the same label. If a plurality of areas assigned with different labels are connected indirectly, however, a large memory space may be required unless the information about connections is stored in a devised manner. Further, the information about connections between labels may be partially lost An SIMD-type microprocessor is capable of performing the same execution simultaneously on a plurality of data items in response to a single instruction. Because of this feature, SIMD-type microprocessors are frequently employed for the processing in which the amount of data is extremely large and data are simultaneously subjected to the same execution (e.g., image processing in a digital copier).

In normal image processing by an SIMD-type microprocessor, a plurality of processor elements (PE) are arranged in the main scan direction, so that the same execution is performed simultaneously on a plurality of data items, thereby achieving high-speed processing.

How to perform labeling as previously described is also an issue in the SIMD-type microprocessors.

Patent Document 1 provides for the SIMD processor to perform part of the tentative labeling process on image data as simultaneous parallel processing, thereby reducing the processing time required for labeling. However, there is no disclosure of a tentative labeling process applicable to the case in which binary image data is comprised of such complex patterns that a plurality of areas having different labels assigned by preceding processes later turn out to be indirectly connected.

Patent Document 2 performs a tentative labeling process with respect to two-dimensionally arranged image data by referring to tentative label values assigned to an adjacent pixel on the left and an adjacent pixel oh the top side with respect to each pixel in a diagonal direction, thereby providing for an SIMD processor to perform all the tentative labeling processes on the image data as parallel processing. Since this process is performed in parallel with respect to each pixel in a diagonal direction, more PEs are necessary than the number of pixels in one line, resulting in a drop in the performance of SIMD processing. Further, like Patent Document 1, there is no disclosure of a tentative labeling process applicable to the case in which binary image data is comprised of complex patterns.

[Patent Document 1] Patent No. 2734959

[patent Document 2] Japanese Patent Application Publication No. 2002-230540

Accordingly, there is a need for an image processing apparatus that allows an SIMD-type microprocessor to perform part of the tentative labeling process as parallel processing so as to reduce the processing time, thereby performing labeling effectively even with respect to binary image data comprised of complex patterns, with simple hardware such as a data controlling unit and a memory unit added to the SIMD-type microprocessor.

SUMMARY

In an aspect of this disclosure, there is an image processing apparatus which includes a plurality of processor elements including registers and configured to process respective data items, a global processor configured to control the plurality of processor elements, the global processor and the plurality of processor elements constituting an SIMD microprocessor, and a data control device coupled to a data transfer port for accessing the registers, the processor elements configured to perform a contiguity check and tentative labeling of pixels adjacent in a sub-scan direction as parallel processes with respect to binary image data, the data control device configured to perform a contiguity check and tentative labeling of pixels adjacent in a main scan direction as consecutive processes, and the parallel processes performed ahead of the consecutive processes with respect to a line of interest in the binary image data.

According to another aspect of the present invention, the data control device includes a label control unit, the label control unit including a label register configured to store a label assigned to binary pixel data, and a counter configured to increment a tentative label value, wherein the label control unit is configured to compare the binary pixel data read from the data transfer port with a current value of the label register, and to determine a value of the counter and a new value of the label register based on a result of the comparison thereby to assign a tentative label to the binary pixel data.

According to another aspect of the present invention, the image processing apparatus further includes a memory configured to store information about connections between contiguous labels, wherein the data control device further includes a memory control unit configured to determine an address and data for controlling the memory in accordance with processing by the label control unit, and wherein the label control unit is configured to compare the binary pixel data read from the data transfer port, the current value of the label register, and the information about connections between labels stored in the memory, and to determine the value of the counter and the new value of the label register based on a result of the comparison thereby to assign a tentative label to the binary pixel data.

According to another aspect of the present invention, the global processor is configured to check information about connections between labels stored in memory, to find a tentative label that is to become an unused number at a time of a final labeling process, and to write to the memory information for shifting forward a tentative label having a larger value than the tentative label to become an unused number such as to eliminate the tentative label to become an unused number.

According to another aspect of the present invention, the label control unit is configured to determine a value of the label register based on information about connections between labels stored in memory and a tentative label read from the data transfer port, thereby updating the tentative label with a final label.

According to another aspect of the present invention, the image processing apparatus further includes a memory switch configured to control interconnections between the data control device and the memory, the memory switch being operable to couple the memory to a data control unit separate from the data control device.

According to at least one embodiment of the invention, the addition of simple hardware to the SIMD-type microprocessor makes it possible to perform tentative labeling with respect to binary image data.

Further, in the case of the use of information about connections between contiguous tentative labels, the size of the memory device for storing the information about connections is kept to a minimum, and the tentative labeling process is performed in such a manner that a subsequent final labeling process is easily done with respect to complex binary image data having a plurality of different tentative labels indirectly connected to each other.

Moreover, the final labeling process is performed with respect to the post-tentative-labeling-process image data in such a manner as to avoid the creation of unused numbers, thereby updating the tentative labels with final labels.

Further, when the image processing apparatus is not attending to the labeling process, the memory device for storing information about connections between tentative labels is usable for other purposes, which achieves the efficient use of the memory device for the processor as a whole.

BRIEF DESCRIPTION OF THE DRAWINGS

Other aspects and further features of the present invention will be apparent from the following detailed description when read in conjunction with the accompanying drawings, in which;

FIG. 2A is an illustrative drawing showing binary image data;

FIG. 2B is an illustrative drawing showing what is obtained after tentative labeling is performed with respect to the binary image data of FIG. 2A;

FIG. 2C is an illustrative drawing showing what is obtained after a final labeling process;

FIG. 3 is a block diagram showing the outline of the data control device according to a second embodiment of the present invention;

FIGS. 4A through 4D are illustrative drawings showing changes in image data when a tentative labeling process is performed on binary image data;

FIGS. 4E through 4H are tables showing the way a label connection information storing memory is updated when the tentative labeling process is performed on the binary image data;

FIGS. 5A through 5D are illustrative drawings showing changes in the image data when the tentative labeling process is performed on the binary image data;

FIGS. 5E through 5H are tables showing the way the label connection information storing memory is updated when the tentative labeling process is performed on the binary image data;

FIGS. 6A through 6D are illustrative drawings showing changes in the image data when the tentative labeling process is performed on the binary image data;

FIGS. 6E through 6H are tables showing the way the label connection information storing memory is updated when the tentative labeling process is performed on the binary image data;

FIGS. 7A through 7D are illustrative drawings showing changes in the image data when the tentative labeling process is performed on the binary image data;

FIGS. 7E through 7H are tables showing the way the label connection information storing memory is updated when the tentative labeling process is performed on the binary image data;

FIGS. 8A and 8B are illustrative drawings showing changes in the image data when the tentative labeling process is performed on the binary image data;

FIGS. 8C and 8D are illustrative drawings showing image data after final labeling is performed with respect to the image data shown in FIG. 8B;

FIGS. 8E and 8F are tables showing the way the label connection information storing memory is updated when the tentative labeling process is performed on the binary image data;

FIGS. 8G and 8H are tables showing the updated status of the label connection information storing memory when the final labeling is performed with respect to the status shown in FIG. 8F;

DESCRIPTION OF THE PREFERRED EMBODIMENTS

In the following, embodiments of the present invention will be described with reference to the accompanying drawings.

Figure 10:
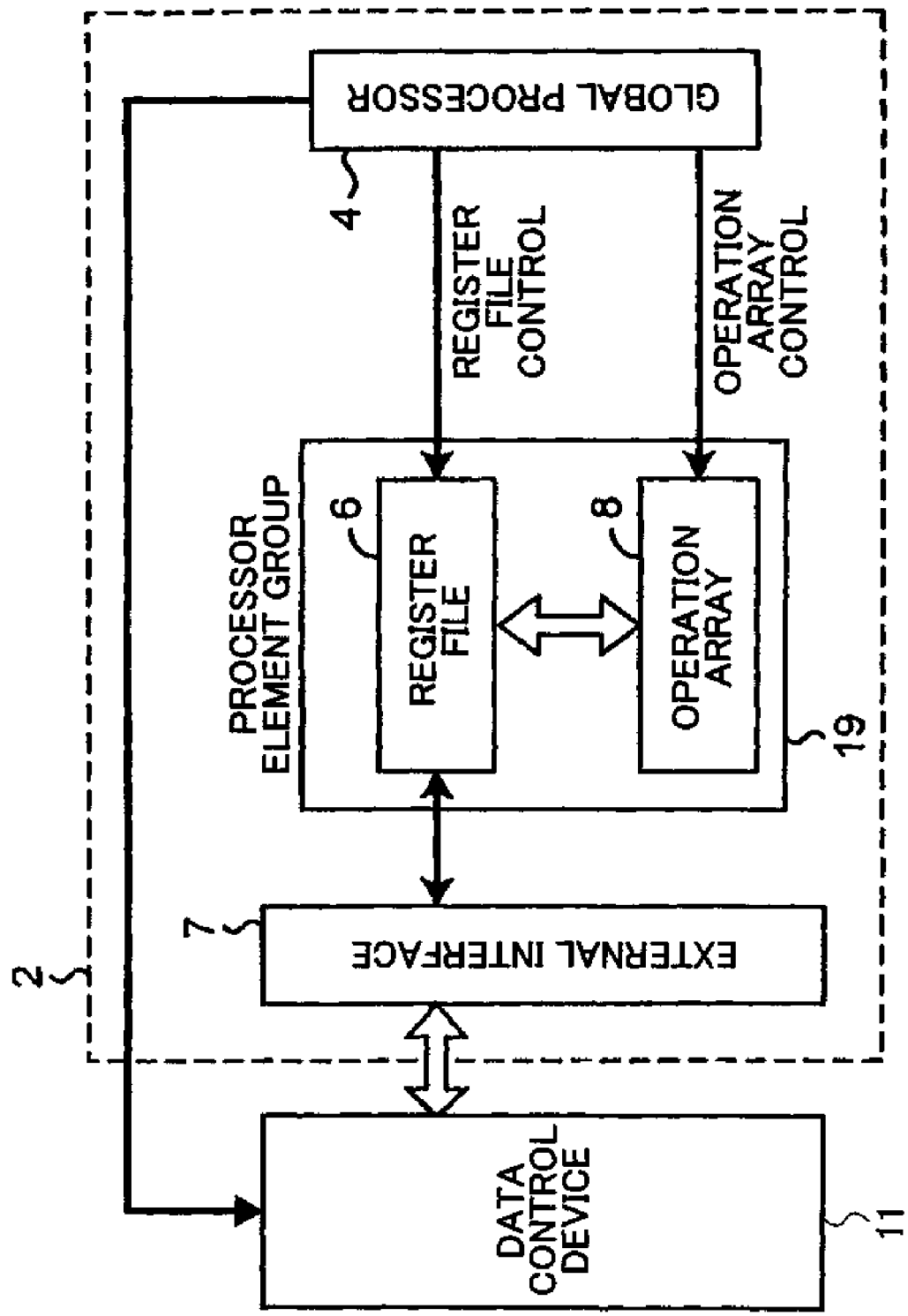
FIG. 10 is a block diagram showing the construction of an image processing apparatus according to the present invention.

FIG. 10 is a block diagram showing the construction of an image processing apparatus according to the present invention. This image processing apparatus includes an SIMD-type microprocessor 2 and a data control device 11. The SIMD-type microprocessor 2 mainly includes a global processor 4, a register file 6, an operation array 8, and an external interface 7.

(1) Global Processor 4

The global processor 4 per se is an SISD (single instruction stream and single data stream)-type processor. The global processor 4 includes a program RAM 10 and a data RAM 12 (see FIG. 11), and decodes a program to generate various control signals. The control signals are not only used to control various built-in blocks, but also supplied to the register file 6, the operation array 8, and the data control device 11. When GP (global processor) instructions are performed, various operations and program control processes are performed by use of built-in general-purpose registers, an ALU (arithmetic logic operation unit), etc.

(2) Register File 6

The register file 6 stores data processed by PE (processor element) instructions. As is known, a PE (processor element) 3 is a constitutional unit that performs an individual operation in a SIMD (single instruction stream and multiple data stream)-type microprocessor. As shown in the register file 6 and the operation array 8 of FIG. 11, 256 PEs 3 are included in the SIMD-type microprocessor 2 of FIG. 11. A PE instruction is an SIMD-type instruction, so that the same process is performed simultaneously with respect to a plurality of data items stored in the register file 6. The global processor 4 controls the reading/writing of data from/to the register file 6. The read data is sent to the operation array 8. After processing by the operation array 8, the data is written to the register file 6.

Moreover, the register file 6 is accessible through the external interface 7 from the data control device 11, which is provided outside the processor. Separately from the control of the SDRAM controlling unit 4, the reading/writing of data is performed to particular registers from the exterior of the processor.

(3) Operation Array 8

The operation array 8 performs operations according to PE instructions. The global processor 4 controls all the operations.

(4) Data Control Device 11

The data control device 11 stipplies clock, address, and read/write control signals to the port of die external interface 7. thereby reading and processing data from the register or any desired PE 3. The global processor 4 an ends to all the control of such operations.

Figure 11:
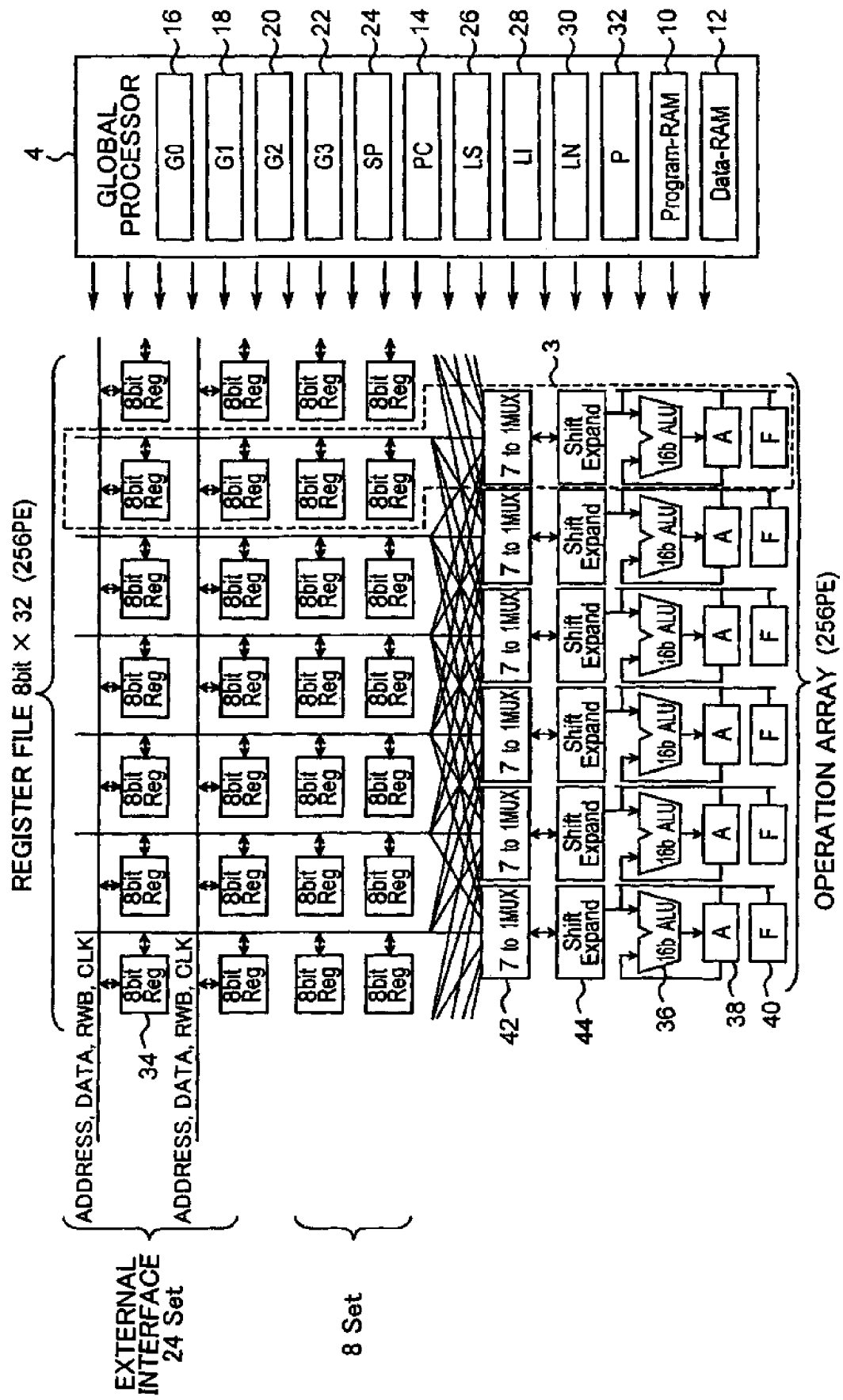
FIG. 11 is a block diagram showing the detailed construction of an SIMD-type microprocessor according to the present invention.

FIG. 11 is a block diagram showing the further detailed construction of the SIMD-type microprocessor 2 according to the present invention.

The global processor 4 includes as built-in memories the program RAM 10 for storing programs for the processor 2 and the data RAM 12 for storing operation data. The global processor 4 further includes, as built-in elements, a program counter (PC) 14 for storing a program address, general-purpose registers (G0, G1, G2, and G3) 16, 18, 20, and 22 for storing operation data, a stack pointer (SP) 24 for storing an address of the RAM to which data are evacuated at the time of register evacuation and recovery, a link register (LS) 26 for storing an address of the position where a call originates at the time of subroutine call, an LI register 28 and LN register 30 for storing branch originating addresses at the time of IRQ (interrupt request) and NMI (non-maskable interrupt request), and a processor status register (P) 32 for storing the status of the processor.

These registers, an instruction decoder, an ALU, a memory control circuit, an interruption control circuit, an external I/O control circuit, and a GP operation control circuit (not shown) are used to execute GP instructions.

At the time of PE instruction execution, a command decoder (not shown), a register file control circuit (not shown), and a PE operation control circuit (not shown) are used to control the register file 6 and the operation array 8.

In the register file 6, 32 8-bit registers are provided for each PE. urid sets of such 32 registers forni an array structure for 256 PEs. Registers 34 are referred to as RI), R1, R2, . . . , and R31 for each PE. Each register 34 has one read port and one write port with respect to the operation array, and is accessed from the operation array via an 8-bit bus for both the read operation and the write operation. Among the 32 registers. 24 registers (R0-R23) are accessible from the exterior of the processor via the external interface 7. With a clock (CLK), an address (Address), and a read/write control (RWD), any desired register 34 can be accessed for data reading/writing.

When accessing the register 34 from the exterior, a single external port provides for one register 34 of each PE to be accessed. An address entered from the exterior specifies the sequence number (0-255) of a selected PE. A total of 24 external ports are thus provided for register access. An access from the exterior is performed by use of 16-bit data, and two registers (a pair comprised of a register of an even-numbered PE and a register of an odd-numbered PE) are accessed simultaneously by a single access operation.

The operation array 8 includes a 16-bit ALU 36, a 16-bit A register 38, and an F register 40. An operation according to a PE instruction is performed by having either the data read from the register file 6 or the data supplied from the global processor 4 as one of the inputs into the ALU 36 and having the content of the A register 38 as the other input. The outcome of the operation is stored in the A register 38. In this manner, an operation between the data supplied from either the registers (R0-R31) 34 or the global processor 4 and the data stored in the A register 38 is performed.

Multiplexers 42 each for 7-to-1 selection are provided as couplings between the register file 6 and the operation array 8. As shown in FIG. 11, each multiplexer 42 is configured to select an operand among the data from the registers (R0-R31) 34 of the three adjacent PEs 3 on the left-hand side, the data from the registers (R0-R31) 34 of the three adjacent PEs 3 on the right-hand side, and the data from the registers (R0-R31) 34 of the local PE 3. The 8-bit data of the register file 6 is input into the ALU 36 after a data shift to the left by a desired number of bits by a shift/extension circuit 44.

Further, an 8-bit condition register (not shown) serves to control the active/inactive state of operation on a PE-specific basis. With this provision, it is possible to select and operate only specified PEs 3.

First Embodiment

Figure 1:
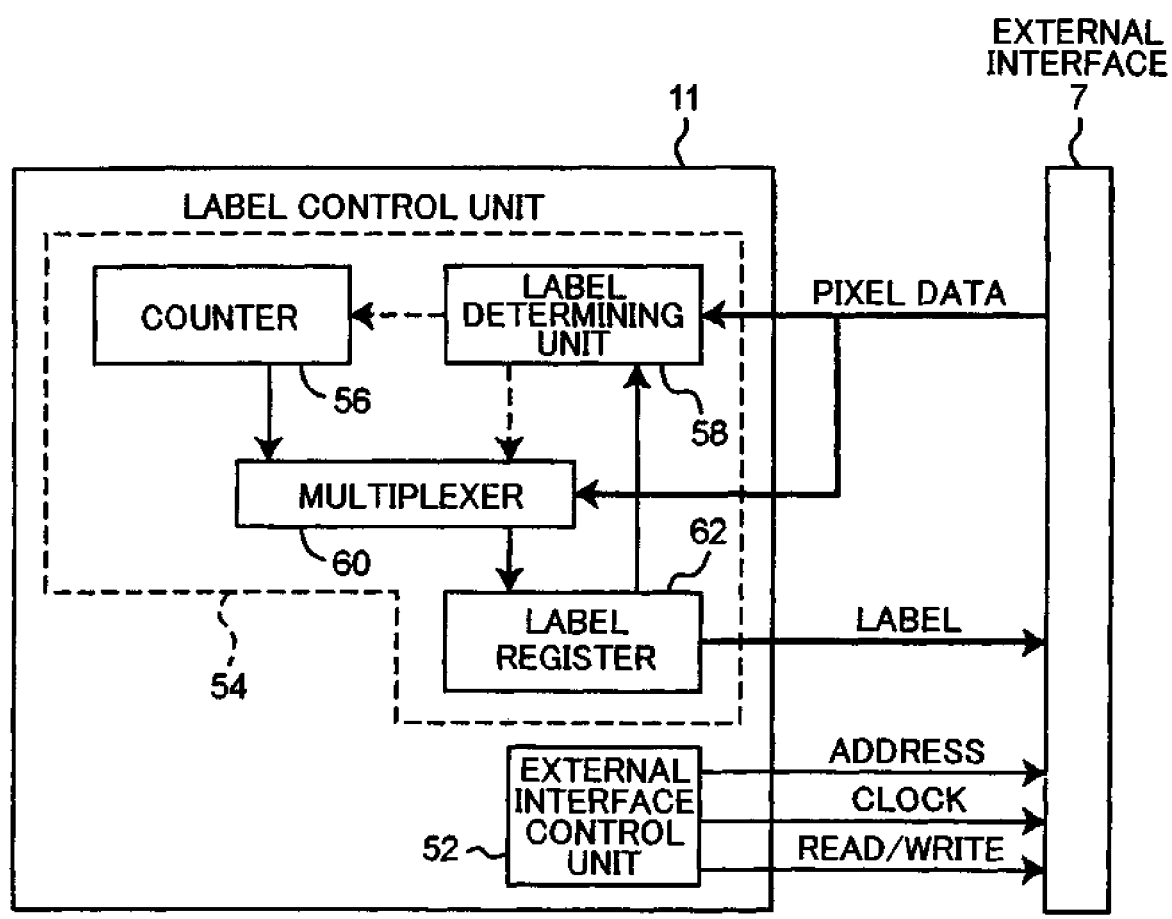
FIG. 1 is a block diagram showing the outline of a data control device according to a first embodiment of the present invention.

FIG. 1 is a block diagram showing the outline of the data control device 11 according to the first embodiment of the present invention.

The data control device 11 according to the first embodiment includes an external interface control unit 52, counter 56, a label determining unit 58, a multiplexer 60, and a label register 62. The external interface control unit 52 controls the external interface 7 by supplying a clock, an address, and a read/write control to the external interface 7. The label determining unit 58 reads pixel data from the register file 6 of the PE 3 through the external interface 7, and also reads the value of the tentative label assigned by the immediately preceding process to the adjacent pixel on the left, thereby determining the value of a tentative label to be assigned to the pixel of interest. The counter 56 newly generate a tentative label based on the determination made by the label determining unit 58. The multiplexer 60 receives the tentative label generated by the counter 56 and the tentative label already assigned to the pixel of interest, and outputs the value of a selected one of these labels that is determined as the tentative label by the label determining unit 58. The label register 62 receives the value from the multiplexer 60, and returns the received value as a tentative label to the external interface 7. An individual "label" is determined through collaboration by the label determining unit 58, the counter 56, the multiplexer 60, and the label register 62. The label determining unit 58, the counter 56, the multiplexer 60, and the label register 62 together constitute a label control unit 54 as shown in FIG. 1.

In the specification of the present application, the processing of pixels scans from left to right in the main scan direction (especially in the drawings), and scans from the top to the bottom in the sub-scan direction (especially in the drawings).

In the configuration described above, "the value of the tentative label assigned by the immediately preceding process to the adjacent pixel on the left", among the data read by the label determining unit 58, is equal to the value currently stored in the label register 62. The external interface control unit 52 includes a built-in address counter (not shown) for supplying an address to the external interface 7. Since all that is necessary is to conduct the transfer of pixel data in an ascending order (or descending order) of addresses, the address counter may be implemented as a simple up (or down)-counter.

With this provision, labeling is properly performed in the case in which binary image data has such patterns that areas having different tentative labels assigned thereto are not subsequently connected together. Here, the binary image data is provided to the SIMD-type microprocessor after the image data is binarized based on a predetermined threshold and filtered for noise reduction.

In the following, a description will be given of the flow of a process performed with respect to 5-by-5 image data as shown in FIG. 2A.

Binary image data is two-dimensionally arranged on the register file 6 of the PEs 3. In general, there are more pixels than PEs in one line of image data. In such a case, a data transfer unit and memory (although not shown) may be provided for the external interface 7. This memory (line buffer) stores image data, which is then transferred successively to the register file of the PEs according to the progress of processing.

Binary image data and tentative labels are defined as follows:
Background Pixel (binary pixel data): 0000h (shown as blank in the drawings);
Feature Pixel (binary pixel data): 8000h (shown as a black circle in the drawings); and
Tentative Label: value from 0001h to 7FFFh (shown as a value from 0001h to 7FFFh in the drawings).

Here, "h" at the end of each number indicates that the number is represented in hexadecimal.

The above definition is provided in consideration of simplicity of processing. That is, background pixels and feature pixels in binary image data can be discriminated from each other by checking only the most significant bit of the 16 bits that constitute the data. Further, the feature pixels inclusive tentative labels can be identified by finding a value larger than 0000h.

Tentative labeling in the first embodiment is mainly comprised of two data processing parts:
processing A1: data processing in the sub-scan direction performed in parallel at once by the SIMD-type microprocessor; and
processing B1: data processing in the main scan direction performed consecutively by the data control device 11.

In the following, the detail of the processing A1 and the processing B will be described.

<<Processing A1>>

The processing A1 is performed in parallel at once with respect to all the pixels in one line.

<Processing A1-1>

The image data of the line immediately above the line of interest is referred to. If the pixel on the same column has an assigned tentative label (i.e., is not equal to 0000h (background pixel) and has binary pixel data equal to 8000h (feature pixel), the tentative label is copied to the line of interest.

<<Processing B1>>

In the processing B1, one of the following processes <processing B1-1> through <processing B1-5> is performed with respect to the pixel of interest. It should be noted that the value of the label register 62 is initialized to 0000h at the beginning of each line.

<Processing B1-1>

In the case of the pixel of interest being 0000h (background pixel), 0000h is stored in the label register 62. The value stored in the label register 62 is return to the register file 6 for storage therein.
Value of Counter after the Process: no increment
Value of Label Register after the Process: 0000h <Processing B1-2>

In the case in which the value of the label register 62 prior to the process is 0000h (i.e., the adjacent pixel on the left is a background pixel), and the pixel of interest is 8000h (feature pixel), the value of the counter 56 is incremented by one, and the incremented value is written to the label register 62. The value written to the label register 62 is returned to the register file 6 for storage therein.
Value of Counter after the Process: an increment equal to 1
Value of Label Register after the Process: the value of the counter after the increment <Processing B1-3>

In the case in which the value of the label register 62 prior to the process is 0000h (i.e., the adjacent pixel on the left is a background pixel), and the pixel of interest is between 0001h and 7FFFh (tentative pixel), the data of the pixel of interest is written to the label register 62. The value written to the label register 62 is returned to the register file 6 for storage therein.
Value of Counter after the Process: no increment
Value of Label Register after the Process: the data of the pixel of interest <Processing B1-4>

In the case in which the value of the label register 62 prior to the process is a value other than 0000h, and the data of the pixel of interest is larger than or equal to the value of the label register 62 (i.e., the pixel of interest is 8000h (feature pixel), or is a tentative label larger than or equal to the tentative label assigned to the adjacent pixel on the left), the value of the label register 62 is left unchanged. The value of the label register 62 is returned to the register file 6 for storage therein.

Value of Counter after the Process: no increment
    Value of Label Register after the Process: no change <Processing B1-5>

In the case in which the value of the label register 62 prior to the process is a value other than 0000h, and the data of the pixel of interest is smaller than the value of the label register 62 (i.e., the data of the pixel of interest is a tentative label smaller than the tentative label assigned to the adjacent pixel on the left), the value (tentative label) of the pixel of interest is written to the label register 62. The value of the label register 62 is returned to the register file 6 for storage therein.

Value of Counter after the Process: no increment
    Value of Label Register after the Process: data of the pixel of interest With this, the description of the processing A1 and processing B1 comes to an end.

Prior to the tentative labeling process, the contents of the counter 56 and the label register 62 shown in FIG. 1 are initialized to 0000h. The processing A1 and the processing B1 are carried out in the order named with respect to each line, and are repeated until the last line. This achieves tentative labeling with respect to the binary image data.

FIG. 2A is an illustrative drawing showing binary image data, and FIG. 23 is an illustrative drawing showing what is obtained after tentative labeling is performed with respect to the binary image data of FIG. 2A. In FIG. 2A, different tentative labels are assigned to contiguous pixels as shown in the fourth and fifth lines. Because of the nature of the processing B1, tentative labels having smaller values are always positioned on the right. After the tentative labeling process is finished with respect to all the lines, therefore, the final labeling process can easily be performed by carrying out the processing BSI in the direction opposite the main scan direction (from the right to the left) with respect to all the lines. FIG. 2C is an illustrative drawing showing what is obtained after the final labeling process.

Second Embodiment

FIG. 3 is a block diagram showing the outline of the data control device 11 according to a second embodiment of the present invention.

The data control device 11 of the second embodiment includes, in addition to the construction of the data control device of FIG. 1, a label connection information storing memory 15 for storing information about connections between tentative labels and a memory control unit 64 for controlling the writing and reading of the information about connections between tentative labels by supplying a clock, data (at the time of writing), an address, and a read/write signal to the label connection information storing memory 15. The memory control unit 64 controls the label connection information storing memory 15 in accordance with the process performed by the label control unit 54.

The label control unit 54 is configured such that the information about connection is supplied via a latch (LT) to the label determining unit 58 and the multiplexer 60 for controlling data written to the label register 62. The purpose of this configuration is to allow an access to be made to the information about connections between tentative labels stored in the label connection information storing memory 15 and to allow such information to be utilized as a tentative label value to be assigned to the pixel of interest.

In the label connection information storing memory 15 according to the second embodiment, an address represents a tentative label value, and 16-bit data is storable at each address so as to provide for the use of the image data as previously defined. The status of each tentative label is represented by the stored data as follows In the case of the data being FFFFh, there is no tentative label corresponding to the address.

In the case of the data being 0000h, there is a tentative label corresponding to the address. Further, no other tentative labels are connected, or the value of the tentative label is the smallest among the contiguous tentative labels.

In the case of the data being from 0001h to 7FFFh, there is a tentative label corresponding to the address, and one or more other tentative labels are connected.

In the description that follows, data stored at an address Addr is sometimes represented as RAM [Addr].

Figures 4A, 4B, 4C, 4D:
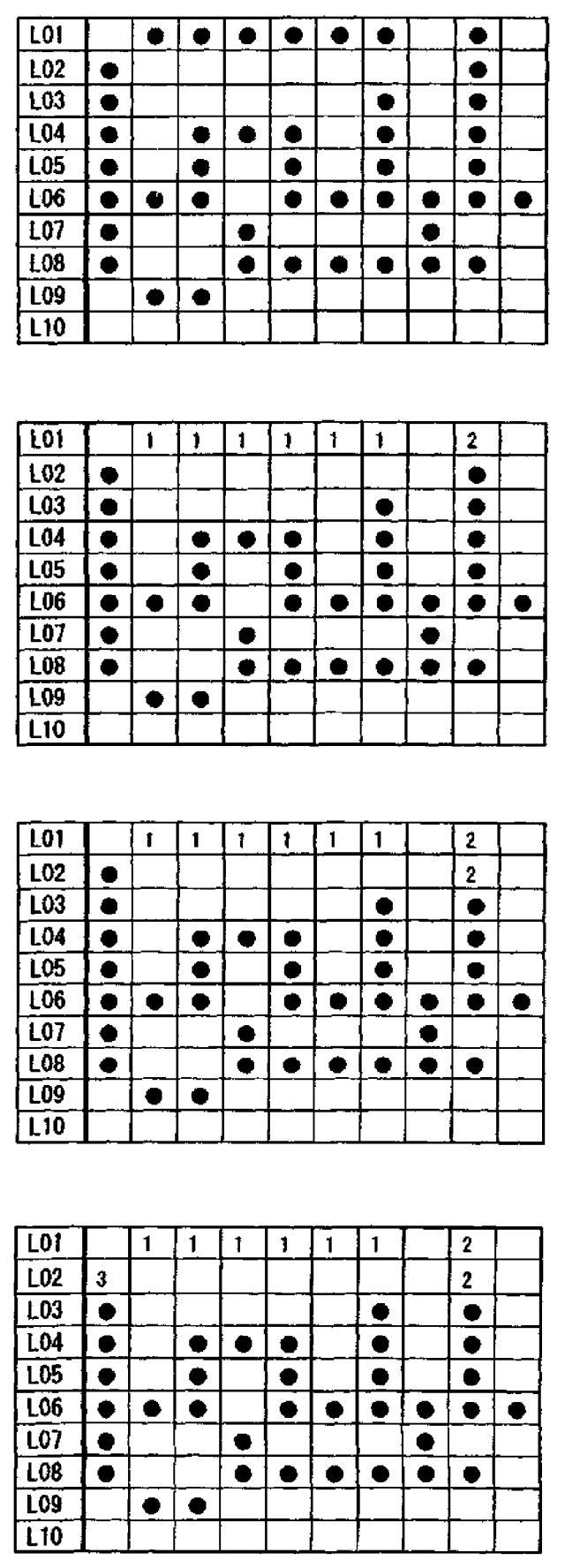

In the following, a description will be given of the flow of a process performed with respect to 10-by-10 image data as shown in FIG. 4A.

As far as the basic principle is concerned, the tentative labeling process of the second embodiment is the same as the tentative labeling process (processing A1 and processing B1) described with reference to the first embodiment. Since the process for generating and referring to information about connections between tentative labels is added, the processing B1 is partially modified. The modified processing B1 will be referred to as processing B2 in the following.

<<Processing B2>>

In the processing B2, one of the following processes <processing B2-1> through <processing B2-5> is performed with respect to the pixel of interest. It should be noted that the value of the label register 62 is initialized to 0000h at the beginning of each line.

<Processing B2-1>

In the case of the pixel of interest being 0000h (background pixel), 0000h is stored in the label register 62. The value stored in the label register 62 is return to the register file 6 for storage therein. No process is performed to generate information about connections.

Value of Counter after the Process: no increment
    Value of Label Register after the Process: 0000h <Processing B2-2>

In the case in which the value of the label register 62 prior to the process is 0000h (i.e., the adjacent pixel on the left is a background pixel), and the pixel of interest is 8000h (feature pixel), the value of the counter 56 is incremented by one, and the incremented value is written to the label register 62. The value written to the label register 62 is returned to the register file 6 for storage therein. Further, as a process for generating information about connections, 0000h is written to RAM [label register after the process].

Value of Counter after the Process: an increment equal to 1
    Value of Label Register after the Process: the value of the counter after the increment
    RAM [label register after the process]: 0000h <Processing B2-3>

In the case in which the value of the label register 62 prior to the process is 0000h (i.e., the adjacent pixel on the left is a background pixel), and the pixel of interest is between 0001h and 7FFFh (tentative pixel), the procedure proceeds to one of the two branches (processing B2-3-1) and (processing B2-3-2) as follows.

(Processing B2-3-1)

In the case of RAM [data of the pixel of interest] being 0000h, the data of the pixel of interest is stored in the label register 62. The value stored in the label register 62 is return to the register file 6 for storage therein. No process is performed to generate information about connections.

Value of Counter after the Process: no increment
Value of Label Register after the Process: data of the pixel of interest (Processing B2-3-2)

In the case of RAM [data of the pixel of interest] being other than 0000h, RAM [data of the pixel of interest] is stored in the label register 62. The value stored in the label register 62 is return to the register file 6 for storage therein. No process is performed to generate information about connections.

Value of Counter after the Process: no increment
Value of Label Register after the Process: RAM [data of the pixel of interest]

<Processing B2-4>

In the case in which the value of the label register 62 prior to the process is a value other than 0000h, and the data of the pixel of interest is 8000h (feature pixel), the value of the label register 62 is left unchanged. The value of the label register 62 is returned to the register file 6 for storage therein. No process is performed to generate information about connections.

Value of Counter after the Process: no increment
Value of Label Register after the Process: no change <Processing B2-5>

In the case in which the value of the label register 62 prior to the process is a value other than 0000h, and the data of the pixel of interest is between 0001h and 7FFFh (tentative label), the procedure proceeds to one of the branches (processing B2-5-1), (processing B2-5-2), (processing B2-5-3), and (processing B2-5-4) as follows.

(Processing B2-5-1)

In the case in which RAM [data of the pixel of interest] is 0000h, and the data of the pixel of interest is larger than or equal to the value of the label register 62 prior to the process, the value of the label register 62 is left unchanged. The value of the label register 62 is return to the register file 6 for storage therein. As a process for generating information about connections, RAM [data of the pixel of interest] is updated with the value of the label register 62. Further, all the values RAM [i] that satisfy RAM [i]=(data of the pixel of interest) are updated with the value of the label register 62. Here, i is incremented one by one by starting from 1 until RAM [i] becomes equal to FFFFh.

Value of Counter after the Process: no increment
Value of Label Register after the Process: no change (Processing B2-5-2)

In the case in which RAM [data of the pixel of interest] is 0000h, and the data of the pixel of interest is smaller than the value of the label register 62 prior to the process, the data of the pixel of interest is written to the label register 62. The value of the label register 62 is return to the register file 6 for storage therein. As a process for generating information about connections, RAM [value of the label register prior to the process] is updated with the value of the label register 62 after the process. Further, all the values RAM [i] that satisfy RAM [i]=(value of the label register prior to the process) are updated with the value of the label register 62 after the process. Here, i is incremented one by one by starting from 1 until RAM [i] becomes equal to FFFFh.

Value of Counter after the Process: no increment
Value of Label Register after the Process: data of the pixel of interest (Processing B2-5-3)

In the case in which RAM [data of the pixel of interest] is a value other than 0000h, and RAM [data of the pixel of interest] is larger than or equal to the value of the label register 62 prior to the process, the value of the label register 62 is left unchanged. The value of the label register 62 is return to the register file 6 for storage therein. As a process for generating information about connections, RAM [RAM [data of the pixel of interest]] is updated with the value of the label register 62. Further, all the values RAM [i] that satisfy RAM [i]=RAM [data of the pixel of interest] are updated with the value of the label register 62. Here, i is incremented one by one by starting from 1 until RAM [i] becomes equal to FFFFh.

Value of Counter after the Process: no increment
Value of Label Register after the Process: no change (Processing B2-5-4)

In the case in which RAM [data of the pixel of interest] is a value other than 0000h, and RAM [data of the pixel of interest] is smaller than the value of the label register 62 prior to the process, RAM [data of the pixel of interest] is written to the label register 62. The value of the label register 62 is return to the register file 6 for storage therein. As a process for generating information about connections, RAM [value of the label register prior to the process] is updated with the value of the label register 62 after the process. Further, all the values RAM [i] that satisfy RAM [i]=(value of the label register prior to the process) are updated with the value of the label register 62 after the process. Here, i is incremented one by one by starting from 1 until RAM [i] becomes equal to FFFFh.

Value of Counter after the Process: no increment
Value of Label Register after the Process: RAM [data of the pixel of interest]

With this, the description of the processing B2 comes to an end.

Prior to the tentative labeling process, the contents of the counter 56 and the label register 62 shown in FIG. 3 are initialized to 0000h, and all the data in the label connection information storing memory 15 are initialized to FFFFh. The processing A1 and the processing B2 are carried out in the order named with respect to each line, which is repeated until the last line. This achieves tentative labeling with respect to the binary image data.

FIGS. 4A through 4D are illustrative drawings showing changes in the image data when the tentative labeling process as described above is performed on the binary image data of FIG. 4A. FIGS. 5A through 5D, FIGS. 6A through 6D, FIGS. 7A through 7D, and FIGS. 8A and 8B also illustrate such changes. FIGS. 4E through 4H are tables showing the way the label connection information storing memory is updated when the tentative labeling process as described above is performed on the binary image data of FIG. 4A. FIGS. 5E through 5H, FIGS. 6E through 6H, FIGS. 7E through 7H, and FIGS. 8E and 8F also illustrate such updates.

FIG. 8B illustrates the image data observed when the tentative labeling process reaches the last line. In FIG. 8B, some pixel areas have different tentative labels despite the fact that they are assigned to contiguous pixels. For any given tentative label, if there is a tentative label smaller than the given tentative label among all the contiguous tentative labels (inclusive of indirectly contiguous tentative labels), the smallest tentative label among those is stored in the label connection information storing memory 15. Because of this, the use of a final labeling process as will be described later makes it possible to assign the same labels.

Third Embodiment

The construction of the data control device according to a third embodiment is the same as that of the data control device according to the second embodiment shown in the relevant block diagram. In the following, a description will be given with a focus on those portions that are added to the data control device of the second embodiment.

In the second embodiment, the final labeling process may be performed by using the information about connections between labels obtained by the tentative labeling process comprised of the processing A1 and the processing B2. In such a case, the tentative labels having the values 0003h, 0004h, 0005h, and 0006h in FIG. 8B are updated with the values stored at the respective addresses. As a result, the tentative labels having the values 0003h, 0004h, 0005h, and 0006h become unused numbers on the image data.

In the third embodiment, processing C1 as shown in the following is performed prior to the final labeling process in order to eliminate the unused numbers of tentative labels. This ensures that no unused number is created after the final labeling process. The processing C1 will be described in the following.

<<Processing C1>>

An address in the label connection information storing memory 15 is denoted as Label. The value of Label is incremented one by one by starting from 1 until RAM [Label] becomes equal to FFFFh. In doing so, either <processing C1-1> or <processing C1-2> described in the following is performed. In the processing cl, a counter (Count: not shown) for counting the number of unused number tentative labels is used. The counter (Count) needs to be initialized to 0000h before the process begins.

<Processing C1-1>

In the case in which the value of RAM [Label] is between 0001h and 7FFFh, the counter (Count) for counting the number of tentative labels becoming unused numbers is incremented by one.

<Processing C1-2>

In the case in which the value of RAM [Label] is 0000h, the value of RAM [Label] is updated to (Label-Count). Further, all the values RAM [i] that satisfy RAM [i]=Label are updated to (Label-Count). Here, i is incremented one by one from (Label+1) until RAM [i] becomes equal to FFFFh.

With this, the description of the processing C1 comes to an end.

The use of the processing C1 makes it possible to examine the data stored in the label connection information storing memory 15 so as to find tentative labels that become unused numbers. (If data other than 0000h is stored as the information about connections, this tentative label will become an unused number after a final labeling process without the processing C1.) As a result, tentative labels having values larger than the tentative labels to become unused numbers are shifted to overwrite the tentative labels to become unused numbers, and information for such shift (i.e., values of tentative labels after the shift) are written to the label connection information storing memory 15.

Although not illustrated, the processing C1 can easily be implemented as software (program) executed by the global processor 4 by configuring the label connection information storing memory 15 to be accessible from the global processor 4 for the reading/writing of data.

FIG. 8C is an illustrative drawing showing image data after the processing C1 is performed with respect to the image data shown in FIG. 5B. FIG. 5G is a table showing the updated status of the label connection information storing memory 15 after the processing C1 is performed with respect to the status shown in FIG. 8F.

Fourth Embodiment

In the data control device according to a fourth embodiment, the processes up to the processing C1 as described above are performed, thereby storing data for updating each tentative label in the label connection information storing memory 15. The data control device of the fourth embodiment then successively updates (performs the final labeling process on) the post-tentative-labeling-process image data by referring to the data for updating tentative labels. Processing D1 serving as this final labeling process is shown in the following. <<Processing D1>>

In the processing D1, either <processing D1-1> or <processing D1-2> described in the following is performed with respect to the pixel of interest.

<Processing D1-1>

In the case of the pixel of interest being 0000h (background pixel), 0000h is stored in the label register 62. The value stored in the label register 62 is return to the register file 6 for storage therein.

<Processing D1-2>

In the case of the pixel of interest being between 0001h and 7FFFh (tentative label), the corresponding updating information (information about connections) in the label connection information storing memory is referred to, and the referred value is written to the label register 62 as a final label. The value written to the label register 62 is returned to the register file 6 for storage therein.

With this, the description of the processing D1 comes to an end.

FIG. 8D is an illustrative drawing showing image data after the processing D1 is performed with respect to the image data shown in FIG. 8C. FIG. 8H is a table showing the updated status of the label connection information storing memory 15. The tentative labels having the values 0003h, 0004h, 0005h, 0006h, and 0007h in FIG. 8C are updated according to the updating information stored in the label connection information storing memory 15. As a result, all the contiguous feature pixels are provided with the same assigned label in FIG. 8D.

Fifth Embodiment

Figure 9:
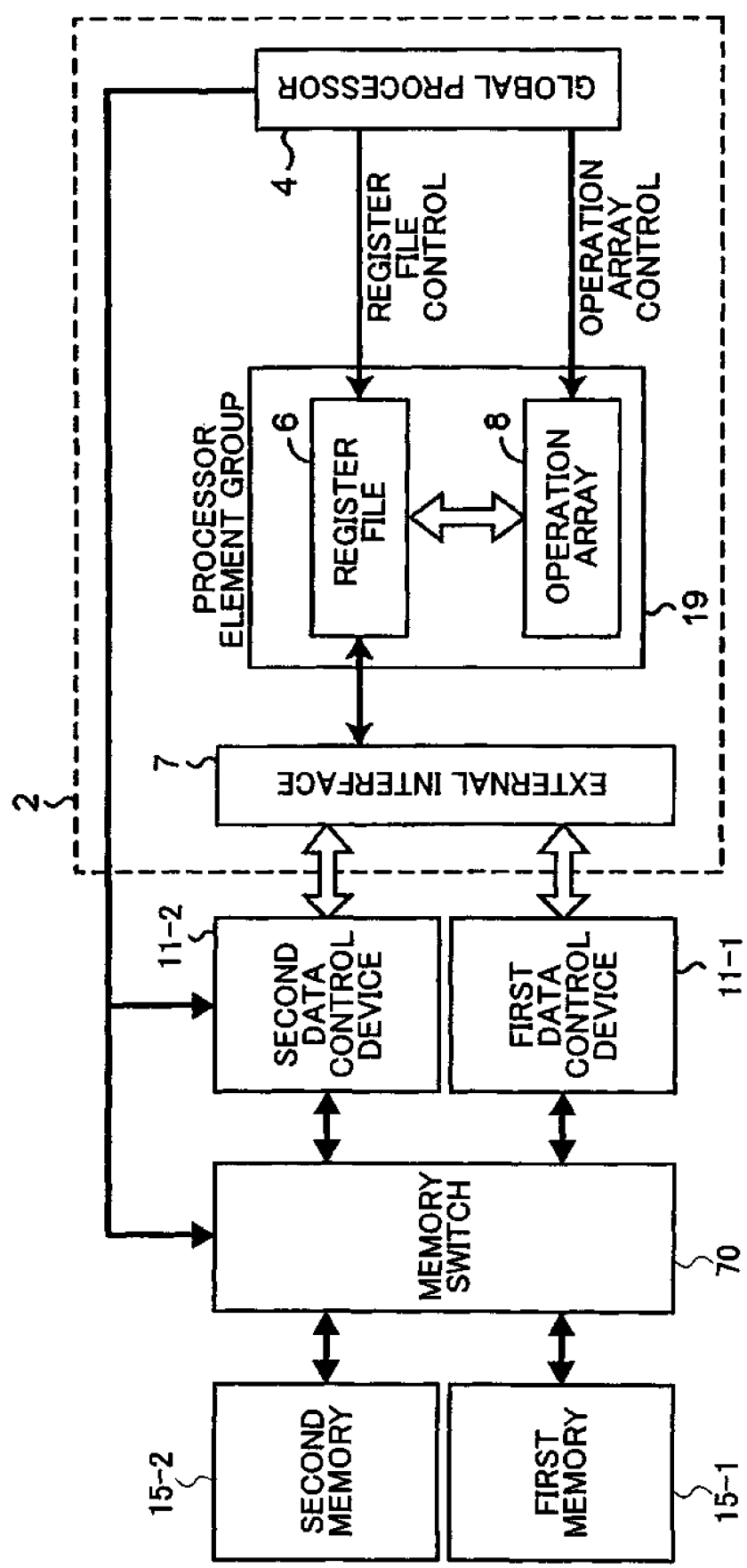
FIG. 9 is a block diagram showing the outline of the image processing apparatus according to a fifth embodiment of the present invention.

FIG. 9 is a block diagram showing the outline of the image processing apparatus according to a fifth embodiment of the present invention.

The external interface 7 is coupled to a is plurality of data control apparatuses (i.e., a first data control device 11-1 and a second data control device 11-2), which are configured to access respective memories (i.e., a first memory 15-1 and a second memory 15-2) via a memory switch 70. All the data control devices are not limited to the data control device of the present invention. A data control device for ordinary line delay, for example, may as well be used.

With the configuration of the image processing apparatus as described above, it is possible to use the memories for storing information about connections between tentative labels for other purposes when the labeling process is not being performed.

Further, the present invention is not limited to these embodiments, but various variations and modifications may be made without departing from the scope of the present invention.

The present application is based on Japanese priority application No. 2003-427624 filed on Dec. 24, 2003, with the Japanese Patent Office, the entire contents of which are hereby incorporated by reference.

What is claimed is:

1. An image processing apparatus comprising:
a plurality of processor elements including registers and configured to process respective data items;
control means for controlling said plurality of processor elements, said control means and said plurality of processor elements constituting an SIMD microprocessor; and
data control device coupled to a data transfer port for accessing the registers,
wherein said processor elements perform a contiguity check and tentative labeling of pixels adjacent in a sub-scan direction as parallel processes with respect to binary image data, said data control device performs a contiguity check and tentative labeling of pixels adjacent in a main scan direction as consecutive processes, and said parallel processes are performed ahead of said consecutive processes with respect to a line of interest in the binary image data.

2. The image processing apparatus as claimed in claim 1, wherein
said data control device cotriprises a label register configured to store a label assigned to binary pixel data, and
said data control device compares the binary pixel data obtained by said dai a control device with a current value of said label register, and determines a new value of said label register bawd on a result of the comparison and thereby assigns a tentative label to cite binary pixel data.

3. The image processing apparacus as claimed in claim 2, further includes
a memory configured to score information regarding connections between contiguous labels, wherein
said data control device further includes a memory control unit configured to determine an address and data for controlling said memory in accordance with processing by said label control unit, and wherein
said data control device determines the new value of said label register based on a result of comparison of the binary pixel data obtained by the data control device, the current value of said label register, and the information stored in said memory regarding the connections between contiguous labels.

4. The image processing apparatus as claimed in claim 3, further comprising a memory svdtch configured to control interconnections between said data control device and said memory, said memory switch being operable to couple said memory to a data control unit separate from said data control device.

5. The image processing apparatus as claimed in claim 2, wherein said data control device determines a value of the label register based on information stored in memory regarding connections between labels and a tentative label obtained by said data control device. and updates the tentative label with a final label.

6. The image processing apparatus as claimed in claim 1, wherein said control means checks information regarding connections between labels stored in memory, determines a first tentative label, writes to said memory information for shifting forward a second tentative label having a larger value than the first tentative label such as to render the first tentative label as an unused number at a time of a final labeling process.

7. An image processing apparatus comprising:
a plurality of processor elements including registers and configured to process respective data items and perform a contiguity check and tentative labeling of pixels adjacent in a sub-scan direction as parallel processes with respect to binary image data; and
a data control device configured to access each of said registers of the processor elements and perform a contiguity check and tentative labeling of pixels adjacent in a main scan direction as consecutive processes, wherein
said parallel processes are performed by said processor elements ahead of said consecutive processes performed by said data control device, with respect to a line or interest in the binary image data.

8. The image processing apparatus as claimed in claim 7, wherein
said data control device comprises a label control unit including a label register configured to store a label assigned to binary pixel data,
said label control unit compares the binary pixel data obtained by said data control device with a current value of said label register, and
determines a new value of said label register based on a result of the comparison and thereby assigns a tentative label to the binary pixel data.

9. The image processing apparatus as claimed in claim 8, further includes a memory configured to store information regarding connections between contiguous labels, wherein
said data control device further includes a memory control unit configured to determine an address and data for controlling said memory in accordance with processing by said label control unit, and wherein
said label control unit determines the new value of said label register based on a result of comparison of the binary pixel data obtained by the data control device, the current value of said label register, and the information stored in said memory regarding the connections between contiguous labels.

10. The image processing apparatus as claimed in claim 9, further comprising a memory switch configured to control interconnections between said data control device and said memory, said memory switch being operable to couple said memory to a data control unit separate from said data control device.

11. The image processing apparatus as claimed in claim 8, wherein said label control unil determines a value of the label register based on information stored in memory regarding connections between labels and a tenative label obtained by said data control device, and updates the tentative label with a final label.

12. The image processing apparatus as claimed in claim 7, wherein said data control device comprises a label register configured to store a label assigned to binary pixel data, compares the binary pixel data obtained by said data control device with a current value of said label register, and determines a new value of said label register based on a result of the comparison and thereby assigns a tentative label to the binary pixel data.

13. The image processing apparatus as claimed in claim 12, further includes
a memory configured to store information regarding connections between contiguous labels, wherein said data control device furtber includes a memory control unit configured to determine an address and data for controlling said memory in accordance with processing by said label control unit, and wherein said data control device determines the new value of said label register based on a result of comparison of the binary pixel data obtained by the data control device, the current value of said label register, and the information stored in said memory regarding the connections between contiguous labels.

14. The image processing apparatus as claimed in claim 13, further comprising a memory switch configured to control interconnections between said data control device and said memory, said memory switch being operable to couple said memory to a data control unit separate frctm said data control device.

15. The image processing apparatus as claimed in claim 7, further comprising a control pea configured to control said plurality of processor elements and determine a first tentative label.

16. The image processing apparatus as claimed in claim 12, wherein said control part checks information regarding connections between labels stored in memory, writes to said memory information for shifting lbrward a second tentative label having a larger value than the first tentative label such as to render the first tentative label as an unused number at a time of a final labeling process.

17. A method for performing labeling of pixels in an image processing apparatus, said method comprising:
 (a) using a plurality of processor elements to perform a contiguity check and performing tentative labeling of pixels udjacent in a sub-scan direction as parallel processes in a plurality of processor elements, with respect to binary image data; and
 (b) using a data control device to perform a contiguity check and tentative labeling of pixels adjacent in a main scan direction as consecutive processes,
 wherein said parallel processes are performed in (a) ahead of said consecutive processes performed in (b), with respect to a line of interest in the binary image data.

* * * * *